United States Patent
Thompson

(10) Patent No.: US 8,292,096 B2
(45) Date of Patent: Oct. 23, 2012

(54) SPICE RACK FOR MINI SPICE CONTAINERS

(76) Inventor: Alan S. Thompson, Kelley, IA (US)

( * ) Notice: Subject to any disclaimer, the term of this patent is extended or adjusted under 35 U.S.C. 154(b) by 356 days.

(21) Appl. No.: 12/251,052

(22) Filed: Oct. 14, 2008

(65) Prior Publication Data

US 2010/0089848 A1    Apr. 15, 2010

(51) Int. Cl.
 *A47B 73/00* (2006.01)
(52) U.S. Cl. ......................................... 211/77; 211/59.2
(58) Field of Classification Search ............. 211/59.2, 211/77, 78, 163, 126.12, 188, 194, 85.26, 211/59.4; 312/42, 43, 45; 220/23.83; 206/503, 206/507, 821; 221/130
See application file for complete search history.

(56) References Cited

U.S. PATENT DOCUMENTS

| | | | |
|---|---|---|---|
| 150,718 A | 5/1874 | Seavey | |
| 170,288 A | 11/1875 | Miller | |
| 494,704 A * | 4/1893 | Hansen | 211/78 |
| 905,975 A * | 12/1908 | Anderson | 211/76 |
| 954,143 A | 4/1910 | Schultz | |
| 1,728,512 A * | 9/1929 | Sharp | 211/77 |
| 1,759,140 A * | 5/1930 | Silberger | 211/77 |
| 1,998,490 A * | 4/1935 | Carrm | 211/14 |
| 2,114,735 A | 4/1938 | Crilly | |
| 2,694,495 A | 11/1954 | Faures | |
| 2,883,063 A * | 4/1959 | Baren | 211/78 |
| 2,911,107 A | 11/1959 | Francavillo | |
| 3,306,464 A * | 2/1967 | Rogers | 211/78 |
| 3,888,348 A * | 6/1975 | Frey | 206/427 |
| 4,057,931 A * | 11/1977 | Stutelberg et al. | 47/83 |
| 4,438,853 A | 3/1984 | Numbers | |
| 4,643,104 A | 2/1987 | Rasmussen | |
| 4,688,684 A * | 8/1987 | Young et al. | 211/59.4 |
| 4,895,260 A | 1/1990 | Ancona et al. | |
| 5,083,670 A | 1/1992 | Zimmer | |
| 5,183,165 A | 2/1993 | Acona et al. | |
| 5,641,080 A | 6/1997 | Humphrey | |
| 6,062,398 A | 5/2000 | Thalmayr | |
| 6,500,666 B1 * | 12/2002 | Clements-Macak et al. | 435/303.3 |
| 6,505,747 B1 | 1/2003 | Robertson | |
| 6,585,119 B2 * | 7/2003 | Palder | 211/49.1 |
| D490,273 S | 5/2004 | Hockey | |
| 6,755,310 B1 * | 6/2004 | Hilton et al. | 211/59.2 |
| 6,905,034 B2 | 6/2005 | Jones | |
| 7,083,070 B2 * | 8/2006 | McGuyer | 222/144 |
| 7,275,647 B1 | 10/2007 | Thompson | |
| 2002/0170868 A1 * | 11/2002 | Morgan | 211/77 |

* cited by examiner

*Primary Examiner* — Korie Chan

(74) *Attorney, Agent, or Firm* — McKee, Voorhees & Sease, P.L.C.

(57) ABSTRACT

A spice rack is provided for mini spice containers. The rack includes a spindle with a rotatable carriage having multiple rows of container compartments. Each compartment is adapted to hold a single spice container. In one embodiment the rows are offset with respect to one another, so that a person can easily grasp the top and bottom of a container for removal from the compartments, with the upper edges of each row of compartments supporting the containers in the next vertically adjacent row of compartments. In a second embodiment, the compartment is shorter than the container so that a person can grip the upper end of the container for removal from the compartment. The containers snap fit into the opening between the resilient side walls of the compartments.

12 Claims, 5 Drawing Sheets

SPICE RACK FOR MINI SPICE CONTAINERS

BACKGROUND OF THE INVENTION

Mini spice containers are popular in home kitchens. Spice containers having other shapes are also commonly found in the home kitchen. Such containers are typically kept in kitchen drawers and cabinet shelves. However, such storage of these spice containers is often undesirable due to limited drawer space, and difficulty in displaying numerous spice containers.

Countertop spice racks having various designs have been used for holding and displaying spice containers for easy access by a cook. Typically, conventional carousel style spice racks have a carriage which is rotatably mounted upon a spindle or upon a turn table for easy display and access to the spice containers. However, such conventional spice containers typically do not hold very many spice containers, and removal of the spice containers from such racks is often difficult or cumbersome.

Therefore, a primary objective of the present invention is the provision of an improved spice rack which holds numerous spice containers.

A further objective of the present invention is the provision of a spice rack having a rotatable carriage which provides for easy insertion and removal of spice containers.

A further objective of the present invention is the provision of a spice rack which can be oriented vertically or horizontally.

Still another objective of the present invention is the provision of a mini spice container rack having finger gripping spaces for removal of containers from the rack.

Yet another objective of the present invention is the provision of a spice rack which can be hung beneath a kitchen cabinet.

Still another objective of the present invention is the provision of a spice rack which can be mounted on a paper towel rack.

Another objective of the present invention is the provision of a spice rack having multiple rows of container compartments.

A further objective of the present invention is the provision of a spice rack which is economical to manufacture and durable in use.

These and other objectives will become apparent from the following description of the invention.

BRIEF SUMMARY OF THE INVENTION

The spice rack of the present invention includes a base with a spindle, and a carriage rotatably mounted on the spindle. The carriage includes multiple rows of compartments, with each compartment being adapted to hold one spice container. In one embodiment, the rows are offset with respect to one another with each compartment having upper and lower ends, such that the upper ends of the first row of compartments supports the spice container in the second row of compartments. Spaces or gaps are provided between adjacent compartments in each row so as to provide a finger gripping space for gripping the top and bottom of a container for removal from the compartments.

In a second embodiment, the rack holds taller spice containers in compartments on a rotatable carriage. The upper and/or lower ends of the containers extend beyond the compartments for easy gripping for removal.

DETAILED DESCRIPTION OF THE PREFERRED EMBODIMENT

Figure 1:
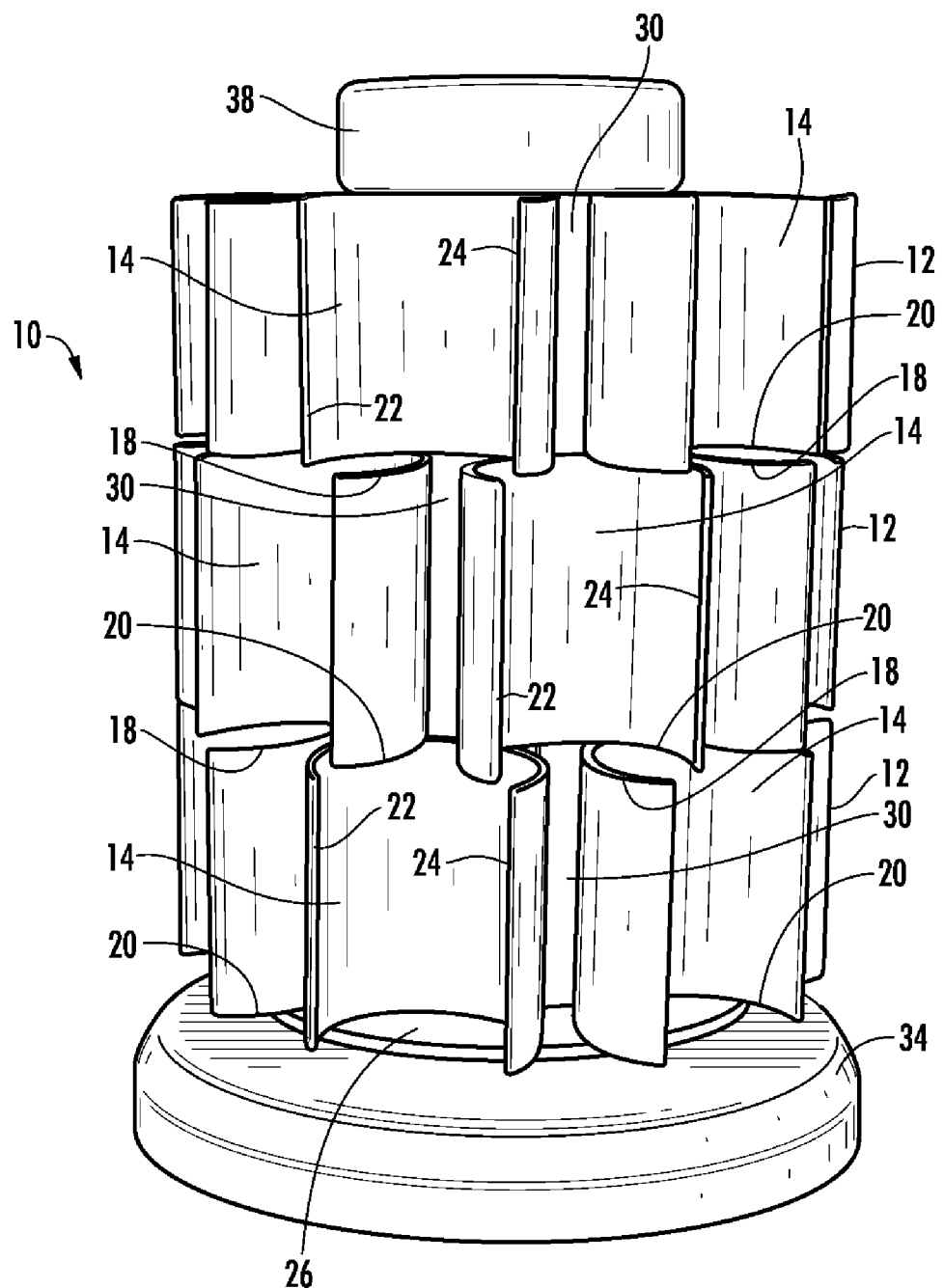
FIG. 1 is a perspective view of the spice rack of the present invention with mini spice containers stored therein.

The first embodiment of a spice rack of the present invention is generally designated by the reference numeral 10 in FIGS. 1-4. The rack 10 includes a rotatable carriage 12 having multiple rows of compartments 14 for holding mini spice containers 16. While the drawings show three rows of compartments 14 on the rack 10, it is understood that the rack may include more or less rows of compartments. The compartments 14 extend slightly beyond 180° so as to be substantially semi-cylindrical in shape. Each compartment 14 is adapted to hold one spice container 16. The compartments 14 include a top edge 18, a bottom edge 20, and left and right sides 22, 24 between which a container 16 is snap fit for receipt in the compartment 14. The top edges 18 of the compartments 14 in the lower row support the bottom of containers 16 in the second row of compartments 14. Similarly, the top edges 18 of the compartments 14 in the middle row support the bottoms of the containers 16 in the upper row of compartments 14. A shelf, ledge or support 26 is provided adjacent the bottom edges 20 of the container of the compartments 14 in the lower row, so as to support containers 16 therein. The compartments 14 may have different heights than shown in the figures so as to hold different size spice containers. Also, the rows may include more or less than the six compartments 14 shown in the drawings.

Figure 3:
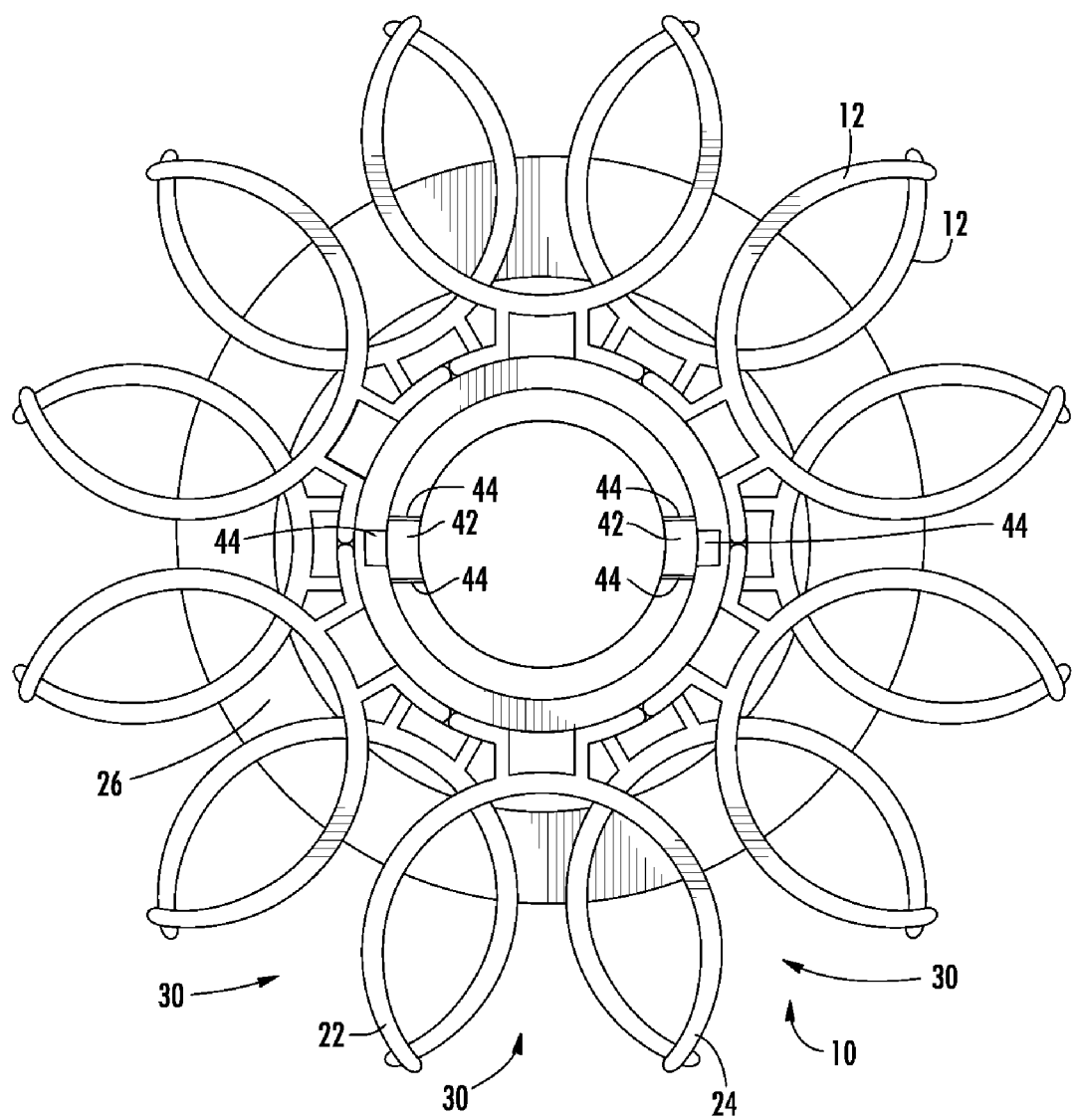
FIG. 3 is a top plan view of the carousel of the rack, without the base and top.

As best seen in FIG. 3, each row has six containers mounted on a central tube 28. The sides 22, 24 of adjacent compartments 14 in each row are spaced apart so as to define a gap 30 therebetween. Each row of compartments 14 is offset with respect to the vertically adjacent row, such that the gaps 30 above and below a particular compartment 14 are substantially centered on that compartment. The gap 30 provides room for a person's finger and thumb to grasp the top and bottom of a container 16 in a vertically adjacent row.

Figure 2:
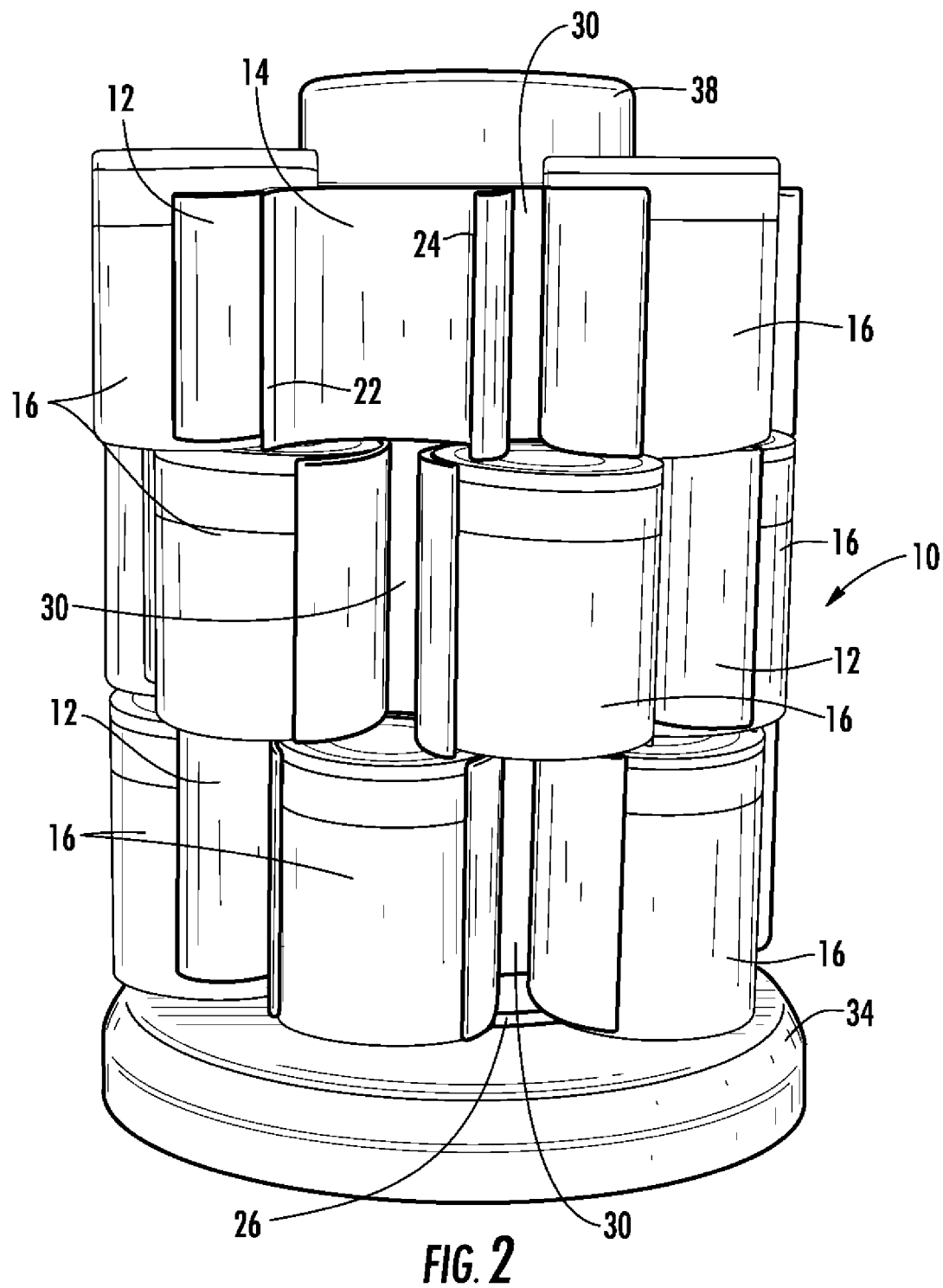
FIG. 2 is a perspective view of the spice rack without containers.

In one preferred embodiment, the carriage 12 is mounted upon a spindle 32 for rotation thereon. The spindle 32 may extend upwardly from a base 34, as shown in FIGS. 1 and 2, such that the rack is oriented vertically. More particularly, the tube 28 of the carriage 12 is rotatably received upon the spindle 32. A bushing 36 at the bottom of the spindle 32 spaces the bottom shelf 26 of the carriage 12 above the base 34. A top cap 38 may be placed on top of the carriage 12 via a collar 40 extending into the tube 28, and glued or otherwise secured so that a person can turn the cap 38 so as to rotate the carriage 12.

Figure 4:
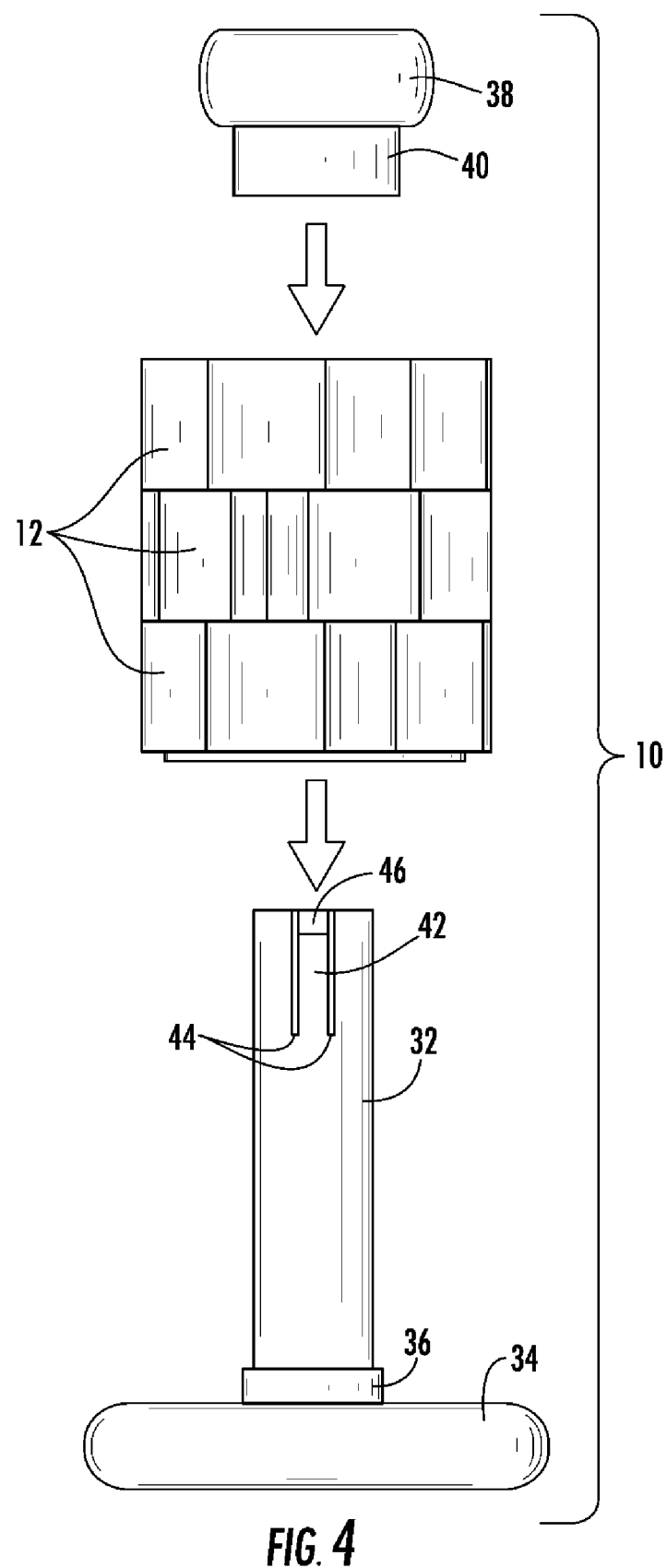
FIG. 4 is an exploded side elevation view of the components of the rack.

As seen in FIG. 4, the spindle 32 may include one or more resilient tabs 42 formed by cuts 44 in the spindle 32. The tabs 42 include a projection 46 extending outwardly. When the tube 28 is assembled onto the spindle 32, the tabs 42 and projections 46 are biased radially inwardly so that the tube 28 can pass over the tabs 42. The tabs 42 then spring outwardly so that the projections 46 extend over the ends of the tube 28 so as to retain the tube 28 on the spindle 32.

In an alternative embodiment, the spindle 32 can be supported by arms of a U-shaped frame mounted to a kitchen wall or other vertical surface with the rack 10 being oriented horizontally or vertically. Such a U-shaped frame can also be set upon the countertop in a vertical orientation, or mounted to the bottom of the kitchen cabinets to support the rack in a horizontal orientation. The frame may be a paper towel rack having arms inserted into opposite ends of the spindle 32.

Figure 5:
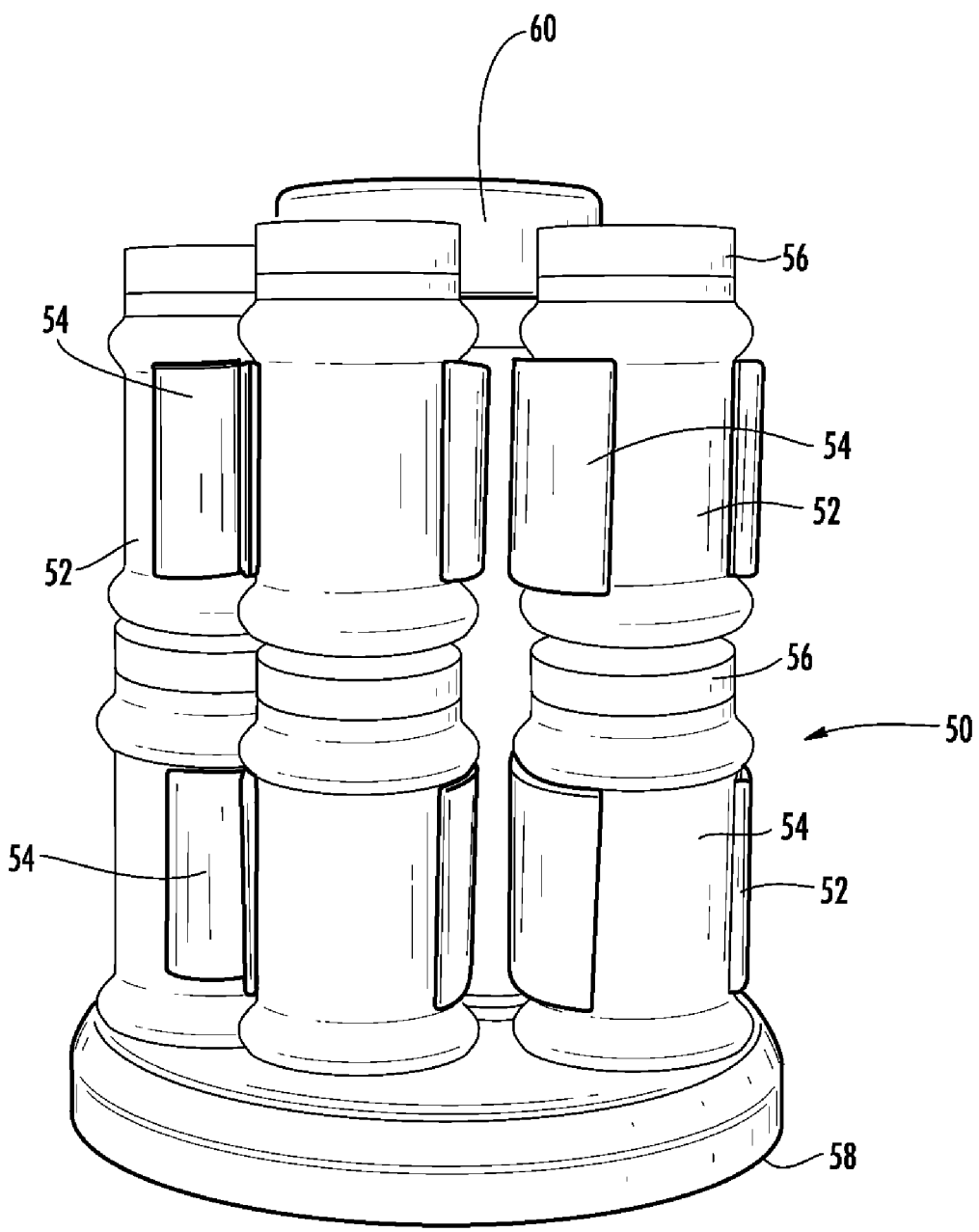
FIG. 5 is a view of one alternative embodiment of the spice rack of the present invention with tall spice containers stored therein.

FIG. 5 shows an alternative embodiment of a rack 50 for holding another common spice container 52 which is taller than the mini containers 16. The rack 50 includes one or more carriages with compartments 54 similar to the carriage 12 and compartments 14 of the rack 10. The spice containers 52 snap fit into the compartments 54 with frictional retention. The upper and/or lower ends of the spice containers 52 extend beyond the compartments 54, as seen in FIG. 5. Thus, the compartments 54 do not extend the full length of the container 52, such that a person can grasp the exposed upper or lower end of the container 52 to remove the container from the compartment 54. The containers 52 may include a rib or increased radius 56 towards the upper and lower ends of the container, with the carriage compartments 54 residing between the upper and lower ribs 56.

The rack 50 includes a base 58 so that the rack 50 can be set upon a countertop. A cap 60 can be turned by a person so as to rotate the rack 50 on the spindle (not shown). The rack 50 may also be mounted in a U-shaped frame which can sit upon a countertop in vertical orientation, or can be mounted to a wall in a vertical or horizontal orientation, or can be mounted beneath a kitchen cabinet in a horizontal orientation.

While FIG. 5 shows two rows of carriages in the rack 50, it is understood that the rack 50 may include one or more carriages. Also, since the upper and/or lower ends of the container 52 extend beyond the compartments 54, the carriages of the rack 50 do not need to be offset as with the carriages 12 of the rack 10. However, it is understood that the carriages of the rack 50 may be offset, as with the carriages 12 of rack 10.

Thus, the rack 10 provides a space-saving device which conveniently displays the spice containers 16 for quick and easy selection by a cook in the kitchen.

The spice rack 10 of the present invention allows the homeowner or cook to organize, easily view, and conveniently use their entire connection of spices with a simple turn of the carousel or carriage 12. The carousel 12 may also hold other types of jars or containers, such as in a handyman or hobbyist shop.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. In combination, a spice rack and a plurality of spice containers, each spice container having a cylindrical body portion, the spice rack comprising:
   a spindle;
   first and second rows of spice compartments rotatably mounted on the spindle;
   both rows having the same number of compartments;
   each compartment having a semi-cylindrical sidewall with upper and lower ends, and with spaced apart edges defining a gap through which one of the spice containers is inserted and removed;
   the compartments in the first row being laterally offset with respect to the compartments in the second row such that the upper ends of the first row of compartments support the spice containers in the second row of compartments; and
   the sidewall of each compartment having an inside diameter substantially equal to an outside diameter of the spice container body portion so as to matingly receive the body portion of the spice container.

2. The combination of claim 1 further comprising a handle on top of the compartments to rotate the compartments.

3. The combination of claim 1 further comprising a shelf below each compartment of the first row to support the containers in the first row compartments.

4. The combination of claim 1 wherein each compartment, sidewall is resilient to receive the spice container.

5. The combination of claim 1 wherein the spice container is snap fit through the gap into the compartment.

6. The combination of claim 1 wherein each compartment extends approximately 180° around a sidewall of the spice container.

7. A spice rack and spice containers, in combination comprising:
   a spindle;
   a carriage rotatably mounted on the spindle;
   first and second rows of spice container compartments mounted to the carriage for rotation therewith;
   the first and second rows being fixed relative to one another so as to rotate together;
   each compartment having a semi-cylindrical vertical side wall adapted to hold one of the spice containers;
   each container having a cylindrical body;
   each compartment having opposite resilient sides with an opening therebetween for receiving and removing the spice container;
   each opening having a width less than the diameter of the container;
   the compartments in the first row being radially offset with respect to the compartments in the second row;
   an open space between the sides of horizontally adjacent compartments in each row, the open space allowing a person to grip a container from the top and bottom in a vertically adjacent row to pull the container through the opening and thereby remove the gripped container from the compartment;
   each compartment having upper and lower ends, such that the upper ends of the first row compartments support containers in the second row compartments.

8. The combination of claim 7 further comprising a shelf below each compartment of the first row to support the containers in the first row compartments.

9. The combination of claim 7 wherein each compartment extends approximately 180° around a sidewall of the spice container.

10. The combination of claim 1 wherein the first and second rows are fixed relative to one another so as to rotate together.

11. The combination of claim 1 wherein an open space is provided between horizontally adjacent compartments adjacent the gaps to allow a person to grip a container from top and bottom in a vertically adjacent row to remove the gripped container from its compartment.

12. The combination of claim 7 wherein both rows have an equal number of compartments.

* * * * *